United States Patent
Rao et al.

(10) Patent No.: US 7,881,745 B1
(45) Date of Patent: *Feb. 1, 2011

(54) ELECTRONIC DEVICE NETWORK EMPLOYING PROVISIONING TECHNIQUES TO UPDATE FIRMWARE AND/OR SOFTWARE IN ELECTRONIC DEVICES

(75) Inventors: Bindu Rama Rao, Laguna Niguel, CA (US); Karl W. Hammerberg, Overland Park, KS (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 589 days.

This patent is subject to a terminal disclaimer.

(21) Appl. No.: 10/797,176

(22) Filed: Mar. 10, 2004

Related U.S. Application Data (60) Provisional application No. 60/453,313, filed on Mar. 10, 2003.

(51) Int. Cl.
*H04W 4/00* (2009.01)
(52) U.S. Cl. .................. 455/551; 455/417; 455/419; 455/418; 455/414.1; 455/550.1; 709/203; 717/173; 717/170; 717/171
(58) Field of Classification Search .......... 455/419, 455/418, 414.4, 420, 451, 417, 550.1, 414.1; 395/662; 709/203; 717/173, 170, 171
See application file for complete search history.

(56) References Cited

U.S. PATENT DOCUMENTS 5,261,055 A 11/1993 Moran et al. ............... 395/275

| | | | |
|---|---|---|---|
| 5,442,771 A | 8/1995 | Filepp et al. | 395/650 |
| 5,479,637 A | 12/1995 | Lisimaque et al. | 395/430 |
| 5,579,522 A | 11/1996 | Christeson et al. | 395/652 |
| 5,596,738 A | 1/1997 | Pope | 395/430 |
| 5,598,534 A | 1/1997 | Haas | 395/200.09 |
| 5,608,910 A | 3/1997 | Shimakura | 395/670 |
| 5,623,604 A | 4/1997 | Russell et al. | 395/200.1 |
| 5,666,293 A | 9/1997 | Metz et al. | 395/200.5 |

(Continued)

FOREIGN PATENT DOCUMENTS

CA 2339923 3/2000

(Continued)

OTHER PUBLICATIONS

"Focus on OpenView A guide to Hewlett-Packard's Network and Systems Management Platform", Nathan J. Muller, pp. 1-291, CBM Books, published 1995.

(Continued)

*Primary Examiner*—Pierre-Louis Desir (57) ABSTRACT

Disclosed herein is a network for managing one of a firmware update service option and a software update service option in electronic devices such as, for example, a mobile handset. The network is capable of determining whether a mobile handset is capable of facilitating firmware updates based upon, for example, firmware update service options (FUSO) and associated FUSO numbers. When a new mobile phone is used for the first time in the electronic device network, an OTAPA process may be employed not only to program number assignment module parameters but also for initiating one of a firmware or software update or for setting flags and parameters that facilitate subsequent firmware or software updates. A mobile handset, may periodically or as necessary, communicate ability to update firmware and/or software to the electronic device network.

30 Claims, 4 Drawing Sheets

U.S. PATENT DOCUMENTS

| | | | |
|---|---|---|---|
| 5,752,039 A | 5/1998 | Tanimura | 395/712 |
| 5,778,440 A | 7/1998 | Yiu et al. | 711/154 |
| 5,790,974 A | 8/1998 | Tognazzini | 701/204 |
| 5,878,256 A | 3/1999 | Bealkowski et al. | 395/652 |
| 5,960,445 A | 9/1999 | Tamori et al. | 707/203 |
| 6,009,497 A | 12/1999 | Wells et al. | 711/103 |
| 6,029,065 A * | 2/2000 | Shah | 455/414.4 |
| 6,038,636 A | 3/2000 | Brown, III et al. | 711/103 |
| 6,047,071 A * | 4/2000 | Shah | 380/273 |
| 6,064,814 A | 5/2000 | Capriles et al. | 395/701 |
| 6,073,206 A | 6/2000 | Piwonka et al. | 711/102 |
| 6,073,214 A | 6/2000 | Fawcett | 711/133 |
| 6,088,759 A | 7/2000 | Hasbun et al. | 711/103 |
| 6,105,063 A | 8/2000 | Hayes, Jr. | 709/223 |
| 6,112,024 A | 8/2000 | Almond et al. | 395/703 |
| 6,112,197 A | 8/2000 | Chatterjee et al. | 707/3 |
| 6,126,327 A | 10/2000 | Bi et al. | 395/200.51 |
| 6,128,695 A | 10/2000 | Estakhri et al. | 711/103 |
| 6,144,849 A * | 11/2000 | Nodoushani et al. | 455/419 |
| 6,157,559 A | 12/2000 | Yoo | 365/52 |
| 6,163,274 A | 12/2000 | Lindgren | 340/825.44 |
| 6,198,946 B1 | 3/2001 | Shin et al. | 455/561 |
| 6,279,153 B1 | 8/2001 | Bi et al. | 717/11 |
| 6,311,322 B1 | 10/2001 | Ikeda et al. | 717/1 |
| 6,438,585 B2 | 8/2002 | Mousseau et al. | 709/206 |
| 6,615,038 B1 * | 9/2003 | Moles et al. | 455/418 |
| 6,725,056 B1 * | 4/2004 | Moles et al. | 455/524 |
| 2001/0029178 A1 | 10/2001 | Criss et al. | 455/419 |
| 2001/0047363 A1 | 11/2001 | Peng | 707/104.1 |
| 2001/0048728 A1 | 12/2001 | Peng | 375/354 |
| 2002/0028673 A1 * | 3/2002 | Chang et al. | 455/419 |
| 2002/0078209 A1 | 6/2002 | Peng | 709/227 |
| 2002/0116261 A1 | 8/2002 | Moskowitz et al. | 705/14 |
| 2002/0131404 A1 | 9/2002 | Mehta et al. | 370/352 |
| 2002/0152005 A1 | 10/2002 | Bagnordi | 700/234 |
| 2002/0156863 A1 | 10/2002 | Peng | 709/217 |
| 2002/0157090 A1 | 10/2002 | Anton, Jr. | 717/178 |
| 2003/0033599 A1 | 2/2003 | Rajaram et al. | 717/173 |
| 2003/0037075 A1 | 2/2003 | Hannigan et al. | 707/500 |
| 2003/0061384 A1 | 3/2003 | Nakatani | 709/245 |
| 2003/0186695 A1 * | 10/2003 | Bridges et al. | 455/432 |
| 2004/0031029 A1 * | 2/2004 | Lee et al. | 717/171 |

FOREIGN PATENT DOCUMENTS

| | | |
|---|---|---|
| JP | 8202626 | 8/1996 |
| KR | 2002-0034228 | 5/2000 |
| KR | 2001-0100328 | 11/2001 |

OTHER PUBLICATIONS

"Client Server computing in mobile environments", J. Jing et al, ACM Computing Surveys, vol. 31, Issue 2, pp. 117-159, ACM Press, Jul. 1999.

"ESW4: enhanced scheme for WWW computing in wireless communication environments", S. Hadjiefthymiades, et al, ACM SIGCOMM Computer Communication Review, vol. 29, Issue 5, pp. 24-35, ACM Press, Oct. 1999.

"Introducing quality-of-service and traffic classes in wireless mobile networks", J. Sevanto, et al, Proceedings of the 1$^{st}$ ACM international workshop on Wireless mobile multimedia, pp. 21-29, ACM Press, 1998.

"Any Network, Any Terminal, Anywhere", A. Fasbender et al, IEEE Personal Communications, Apr. 1999, pp. 22-30, IEEE Press, 1999.

TIA/EIA/IS-683-A: Over-the-Air Service Provisioning of Mobile Stations in Spread Spectrum Systems; May 1998.

3GPP2 C.R1001-A 2.0; Administration of Parameter Value Assignments for cdma2000 Spread Spectrum Standards, Release A; Jul. 14, 2000.

* cited by examiner

ELECTRONIC DEVICE NETWORK EMPLOYING PROVISIONING TECHNIQUES TO UPDATE FIRMWARE AND/OR SOFTWARE IN ELECTRONIC DEVICES

CROSS-REFERENCE TO OTHER APPLICATIONS

The present application claims the benefit of priority of U.S. Provisional Patent Application having Ser. No. 60/453,313, filed on Mar. 10, 2003, and hereby incorporates herein by reference the complete subject matter thereof, in its entirety.

The present application also hereby incorporates herein by reference the complete subject matter of PCT Application having publication number WO/02/41147 A1, and having application number PCT/US01/44034, filed on Nov. 19, 2001, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices, such as mobile phones and personal digital assistants (PDA's), often contain firmware and application software that are either provided by the manufacturers of the electronic devices, by telecommunication carriers, or by third parties. These firmware and application software often contain software bugs. New versions of the firmware and software are periodically released to fix the bugs, introduce new features, or both. Electronic devices, such as for example, mobile handsets, access servers to retrieve updates that may be needed to update firmware and/or software.

Further limitations and disadvantages of conventional and traditional approaches will become apparent to one of skill in the art, through comparison of such systems with some aspects of the present invention as set forth in the remainder of the present application with reference to the drawings appended hereto.

SUMMARY OF THE INVENTION

Aspects of the present invention may be found in a network facilitating interactions between one of a plurality of software components in a electronic device and an associated one of a plurality of servers in the network. The network may comprise a service broker capable of receiving at least one request for service associated with one of the plurality of software components. The service broker may be capable of determining one of the plurality of servers associated with one of the plurality of software components, based upon at least one request for service. The service broker may also be capable of forwarding the at least one request for service to a determined one of the plurality servers.

In an embodiment according to the present invention, the network the service broker may be capable of selectively communicating a response from the determined one of the plurality of servers to one of the plurality of software components in the electronic device.

In an embodiment according to the present invention, the service broker may comprise a software component in the electronic device.

In an embodiment according to the present invention, one of the plurality of servers may comprise a download server capable of receiving a request for an update package. The download server may be capable of sending the requested update package to one of the plurality of software components in the electronic device.

In an embodiment according to the present invention, the update package may comprise a set of executable instructions for converting a first version of a software component to a second version of the software component.

In an embodiment according to the present invention, the service broker may forward the update package to at least one of the plurality of software components in the electronic device.

In an embodiment according to the present invention, one of the plurality of software applications in the electronic device may comprise an update agent capable of processing an update package. The update agent may be capable of being invoked by the service broker when an update package is communicated to the electronic device.

In an embodiment according to the present invention, the update package may comprise a set of executable instructions for converting a first version of a software component to a second version of the software component.

In an embodiment according to the present invention, the at least one request for service may comprise an asynchronous request and the service broker may be capable of communicating a response received from one of the plurality of servers back to the one of the plurality of software components.

In an embodiment according to the present invention, the at least one request for service may comprise an asynchronous request for one of the plurality of software components registers callback information from the service broker. The service broker may communicate a response received from one of the plurality of servers back to the one of the plurality of software applications based upon the registered callback information.

In an embodiment according to the present invention, the service broker may be a server communicatively coupled to the electronic device.

In an embodiment according to the present invention, the service broker server may determine which one of the plurality of servers is available and capable of processing the at least one service request, and subsequently may forward the request to the determined one of the plurality of servers.

In an embodiment according to the present invention, the determined one of the plurality of servers may be forwarded the at least one request for processing, and a response from the determined one of the plurality of servers may be forwarded to the one of the plurality of software components.

In an embodiment according to the present invention, the determined one of the plurality of servers may process the at least one service request. The at least one service request may comprise a request for a software update from the one of the plurality of software components and may retrieve an update package and associated information and may communicate the update package and associated information to the electronic device.

In an embodiment according to the present invention, the plurality of software components may comprise a download agent and an update agent. The download agent may be capable of requesting a software update from the service broker server and receiving in response an update package from the service broker server. The update agent may be capable of processing the received update package for updating at least one of firmware and software in the electronic device.

In an embodiment according to the present invention, a wireless network mat support at least one electronic device. The network may comprise a service broker, a plurality of service providers, wherein each of the plurality of service providers may be communicatively coupled to the service broker and a client-side component in the electronic device requesting a software update from one of the plurality of service providers. The service broker may determine an appropriate one of the plurality of service providers capable of responding to the software update request.

In an embodiment according to the present invention, the wireless network may further comprise a generic intelligent responsive agent in the electronic device. The generic intelligent responsive agent may be communicatively coupled to the service broker. The generic intelligent responsive agent may be capable of establishing a communication link with the service broker server and may also be capable of forwarding the software update request and associated information from the client-side component to the service broker. The service broker server may determine one of the plurality of service providers as a target server capable of processing the software update request and forwarding the software update request to the target server.

In an embodiment according to the present invention, the target server may process the received software update request, retrieve an appropriate update package and associated information, and communicate the appropriate update package and associated information back to the generic intelligent responsive agent for subsequent communication to an associated client-side component.

In an embodiment according to the present invention, the generic intelligent responsive agent may act as a proxy for the client-side component and provide one of asynchronous communication and synchronous communication facilities for interactions with the target server.

In an embodiment according to the present invention, the electronic device may further comprise a registration client capable of maintaining a plurality of registration entries. Each registration entry may be associated with a client-side software component, and each entry may also comprise at least one of a name, version, plurality of dependencies, status specifying a current operational status, plurality of callback functions, an associated parameter, an event, and a return type. Each registration entry may also comprise a set of configuration parameters and a client-side software component specific update agent capable of updating at least one of the set of configuration parameters and the client-side software component. Each registration entry may also comprise a server URL specifying a service provider and associated relevant information.

In an embodiment according to the present invention, the electronic device may further comprise security information.

Aspects of the present invention may also be found in a method for updating at least one of a software component and software component configuration information in a electronic device communicatively coupled to a service broker. The method may comprise registering at least one call-back function available in the software component under the control of the electronic device. The method may also comprise communicating a request for updating of at least one of the software component and software component configuration to the service broker. The method may also comprise receiving results from a remote service provider and invoking the at least one call-back function using the received results. The method may also comprise receiving an update request under the control of the service broker, determining a service provider based upon the update request, invoking update functionality on the determined service provider, and transmitting results of the invoked update functionality to the electronic device.

In an embodiment according to the present invention, the received results may be communicated to an update agent capable of updating the at least one of the software component and software component configuration under the control of the electronic device.

In an embodiment according to the present invention, a request may be communicated by the software component to a generic intelligent responsive agent under the control of the electronic device. The request may comprise a command to be invoked on a remote service provider and parameters to be passed thereto. The request may be communicated to the service broker and the received results may be communicated to the software component. An update request may be received and based upon the update request a service provider may be determined. The update functionality may be invoked on the determined service provider and results of the invoked update functionality may be transmitted to the generic intelligent responsive agent.

These and various other advantages and features of novelty which may characterize the invention are pointed out with particularity in the claims annexed hereto and that form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

DETAILED DESCRIPTION OF THE INVENTION

Electronic devices may be adapted to access servers to retrieve updates for updating at least one of firmware and software. An electronic device may be, for example, a mobile electronic device having software/firmware, such as, mobile cellular phone handsets, personal digital assistants (PDA's), pagers, MP3 players, digital cameras, etc. An update may comprise firmware and software updates that modify or change the version of a particular firmware or software installed in the electronic device, for example, upgrading to a newer version, repairing a bug in the firmware/software, etc. An update may also add new services to the electronic device or delete services, as desired by a service provider, device manufacturer, or an end-user.

An electronic device requesting access to a server may transmit an access request to the network using a first type of communication and the network may respond using the same type of communication. Alternatively, the electronic device may transmit an access request to the network using a first type of communication and the network may respond using a different type of communication. For example, the electronic device may transmit a request to the network using a short message service (SMS) and the network may respond to the request using a circuit switched or packet switched communication service, or the reverse may occur.

Aspects of the present invention may be found in a wireless electronic device network adapted to determine whether individual electronic devices may be updated. In an embodiment according to the present invention, the wireless electronic device network may be adapted to facilitate downloading of update packages by an electronic device. In order to change specific parameters in an electronic device, the electronic device may be either physically connected to a system adapted to change such parameters, or alternatively, the electronic device may be manually modified by an end-user as desired.

In an embodiment according to the present invention, a wireless electronic device network may be adapted to change specific parameters of the electronic device via wireless communication. Wireless communication may also be referred to as Over-The-Air Parameter Administration (OTAPA). OTAPA is disclosed in IS-725-A, pages 1-78, published Apr. 13, 1999 and PCT Application number WO 98/41044 by Northern Telecom® Inc., the entirety of the respective documents incorporated herein in their respective entireties.

According to the publication IS-725-A, an authentication procedure for accessing a communication network may be included in the OTAPA process. However, an authentication procedure for accessing a wireless electronic device served by such a network may not be provided. Updating firmware in particular electronic devices may also not be covered by OTAPA specifications or by other similar specifications. Reliability in updating firmware of electronic devices presents at least one major shortcoming of over the air related specifications.

An OTAPA-based mechanism for setting or changing parameters of an electronic device, has been disclosed by Nokia® in U.S. Pat. No. 6,047,071 (Nokia) issued on Apr. 4, 2000. However, the Nokia patent does not suggest or disclose techniques to update firmware in electronic devices. The Parameter Administration Service Option (PASO) concept and other related concepts require significant enhancement to support firmware update in electronic devices.

Figure 1:
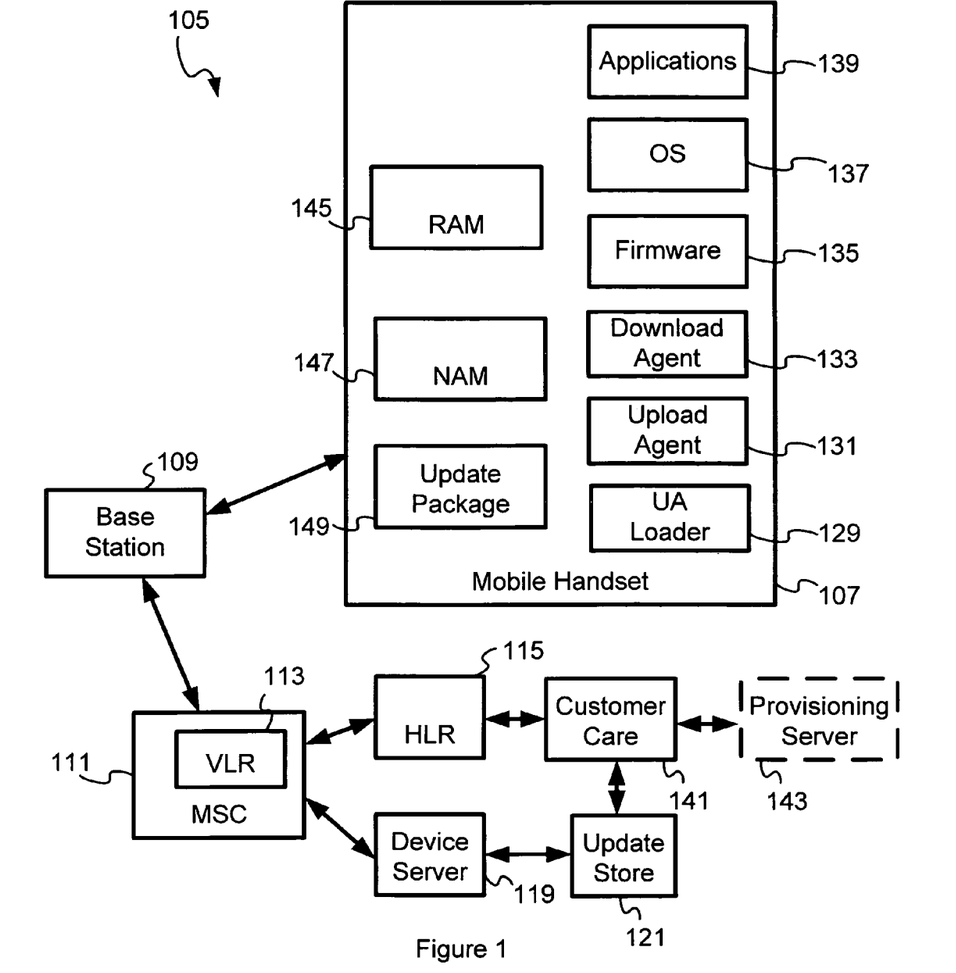
FIG. 1 is a block diagram illustrating an electronic device network capable of provisioning firmware updates to a plurality of electronic devices according to an embodiment of the present invention.

FIG. 1 is a block diagram illustrating an electronic device network 105 capable of provisioning firmware updates to a plurality of wireless electronic devices, such as for example, mobile handset 107 according to an embodiment of the present invention.

FIG. 1 illustrates an electronic device network 105 capable of provisioning firmware updates to a plurality of electronic devices, such as for example, mobile handset 107, wherein the mobile handsets may be communicatively coupled to one of a plurality of device servers 119 via a Mobile Switching Center (MSC) 111 and one of a plurality of base stations, such as a base station 109. The device server 119 may be capable of dispensing update packages, which may be employed to update firmware in the plurality of mobile handsets during a provisioning process. The update package may be dispensed to the mobile handset 107 based upon characteristics of, for example, the individual mobile handset 107 or subscriber using mobile handset 107.

The mobile handset 107 may comprise an update agent capable of updating firmware, software applications, etc. The mobile handset may also comprise a download agent 133, a device server 119, a random access memory (RAM) 145, firmware 135, operating system 137, applications 139, downloaded update package 149, Number Assignment Module (NAM) 147, upload agent 131, and an update application (UA) loader 129. The download agent 133 may be capable of downloading update packages from external systems, such as device server 119, for example. The elements of mobile handset 107, illustrated in FIG. 1, may be provisioned by the electronic device network 105 when the mobile handset 107 is initially set-up and operated.

The MSC 111 is a network element that may be responsible for the actual circuit switched connection of the voice channels. The MSC 111 generally makes very few routing decisions, obtaining the routing decisions ordinarily from the Service Control Point (SCP) applications. The MSC 111 may make some basic routing decisions. The Home Location Register (HLR) 115 may act as a central repository of profiles for each electronic device, e.g., mobile handset 107, and maintain current network location and status of the electronic device. The Visitor Location Register (VLR) 113 is a database that may be located within the MSC 111 and may contain a temporary copy of electronic device profiles obtained from the HLR 115. The VLR 113 may also be stored in close proximity, either physically or logically, to the HLR 115 in order to improve device performance.

The electronic device, for example mobile handset 107, and base station 109 may communicate via particular radio frequencies mandated by appropriate regulatory bodies. Dedicated trunk lines may serve as links between the base station 109 and the MSC 111. Alternatively, an interface between MSC's within the same system (same cellular carrier) and the base stations may be provided by dedicated land lines. Data links may connect the MSC 111 to VLR 113, and also to HLR 115. The HLR 115 may be located at the MSC 111 or at a remote location. Each HLR 115 may serve more than one MSC, for example MSC 111. The VLR 113, however, may be dedicated to the MSC 111 that is currently in control of and communicating with the electronic device, for example, mobile handset 107. The VLR 113 is normally located at the MSC 111. The HLR 115 may be located remotely therefrom.

A subscriber record, created when the MSC 111 is handling the mobile handset 107, may be erased when the mobile handset 107 is no longer active or has moved to the region controlled by another MSC. The HLR 115 is a location register and may contain user identity information, such as, directory number, profile information (feature list), last known network location, and validation period. The VLR 113 may also comprise another location register in which the MSC 111 may temporarily store and retrieve information regarding visiting subscribers or users. A difference between the VLR 113 and the HLR 115 may be that the HLR 115 may comprise a central storage place for subscriber records, whereas the VLR 113 may comprise a temporary storage place that may be used during a configurable period of time. Using the VLR 113 may reduce the amount of network signaling required to process call handling.

To perform Over-The-Air Parameter Administration (OTAPA), various functions may be implemented in each electronic device, for example, mobile handset 107, and each element of a wireless communication network. The mobile handset 107 and the electronic device network 105 may have a capacity to internally generate a random number when necessary, and may also store a secret key (A_KEY), as well as, shared secret data (SSD). The A_KEY may comprise a 64 bit pattern stored in a mobile handset 107 and in one of HLR 115 or an authentication center. The A_KEY may be used to generate or update the electronic device's SSD, which may be a 128 bit pattern stored in the electronic device, and may also be known by the base station 109. The HLR 115 may indicate whether an electronic device supports the OTAPA function.

In an embodiment according to the present invention, the OTAPA-related activity supported by the electronic device network 105 may also implement updating of firmware in electronic devices based upon a firmware update service option (FUSO) that may be accessible by OTAPA-related functions in the electronic device network 105. The FUSO, for example, may be set-up or loaded into the mobile handset 107 by the manufacturer when programming (i.e., flashing) the mobile handset 107.

In an embodiment according to the present invention an aspect of the invention may be found in a means for providing network-initiated over-the-air access to mobile station 107 firmware update service option and firmware update service functions (based upon update agent 131) while initializing (or updating) the Number Assignment Module (NAM) 147 in the mobile handset 107, without requiring user intervention.

In an embodiment according to the present invention an aspect of the invention may also be found in an electronic device network incorporating means for simplifying updating firmware 135 in a mobile handset 107 during administration of NAM parameters by a network service provider.

In an embodiment according to the present invention an aspect of the invention may also be found in an electronic device network incorporating means for scheduling updating firmware 135 in a mobile handset 107 during administration of NAM parameters by a network service provider.

In an embodiment according to the present invention an aspect of the invention may also be found in an electronic device network providing means for preserving security and integrity of firmware related update packages to prevent unauthorized access.

In an embodiment according to the present invention an aspect of the invention may also be found in an electronic device network incorporating means for provisioning universal resource locators (URLs) for one or more servers adapted to communicate with mobile handset 107 during administration of NAM parameters by a network service provider and subsequently be employed to download update packages.

In an embodiment according to the present invention, a firmware update may be incorporated into an Over-The-Air Parameter Administration (OTAPA) procedure employed for installing appropriate parameters into mobile handset 107 when first activated. In an embodiment according to the present invention an aspect of the invention may be found in an extension of the procedure for OTAPA utilizing an over-the-air programming protocol and procedures supporting Over-The-Air Service Provisioning (OTASP) and other features in accordance with established industry standards (TIA/EIA/IS-683). The mobile handset 107 may be programmed with a service option for setting or changing the NAM 147 parameters in the mobile handset 107 and for incorporating a firmware update.

The service option for modification of NAM 147 parameters, Parameter Administration Service Option (PASO), may also have an associated PASO number that may be used to check authenticity of a server-side associated with parameter changes and firmware update activities. The mobile handset 107 may also have one or more parameter change codes (PCC's) store in memory.

In one related embodiment, the electronic device network 105 may possess means for determining whether the mobile handset 107 is OTAPA capable. The base station 109 may, for example, page the mobile handsets 107, (i.e., send a General Page Message to the mobile handset 107), using the PASO number. After verifying the message identity using standard Authentication processes, if the mobile handset 107 is OTAPA capable, the mobile handset set may respond with a Page Response Message, indicating support for PASO by sending the PASO number. If the mobile handset 107 does not support PASO, the response may indicate that the option is unavailable.

PASO enables determination of whether the mobile handset 107 supports NAM 147 programming, as well as firmware updating. Once PASO capability/support is confirmed, the base station 109 may transmit a Channel Assignment Message, enabling the mobile handset 107 to activate a Traffic Channel.

For security reasons, Signaling Message Encryption (SME) may be used in a Channel Assignment Message. Use of encryption may be enforced. Where encryption is optional, if the encryption mode is not enabled, the mobile handset 107 may enter into a Service Negotiation process on the Traffic Channel and may request another service option, indicating that PASO is not supported. Alternatively, the mobile handset 107 may terminate the call according to a Call Release Procedure.

Once the mobile handset 107 has activated the Traffic Channel, an OTASP Data Message may be sent containing a Parameter Change Code (PCC). If the PCC received by the mobile handset 107 matches the PCC for the mobile handset 107, the Data Message may be verified by the mobile handset 107, after which the Data Message may be used to unlock the mobile handset 107, update parameters, and store updated parameters into mobile handset 107 memory (such as non-volatile memory, for example). Additionally, an update package may be downloaded and a firmware update conducted. After verification of the programmed data and the firmware update status in accordance with OTASP processing, the process may be terminated.

A number of different PCC's may be used for different parameters, or different groups of parameters according to NAM 147. The PCC for mobile handset 107 may initially have a pre-set default value that may only be changed with user intervention to prevent unauthorized changes. As long as the PCC value remains the same, no user intervention is required for any other parameter changes that may be initiated by the electronic device network 105 (typically, the service provider). In an embodiment according to the present invention, a special PCC may be associated with firmware/software updating in the mobile handset 107. The special PCC may be an extension of the OTAPA/OTASP standards, for example.

In an embodiment according to the present invention, during OTASP, the firmware update PCC may be tested to determine whether the firmware update should be conducted. The PCC value may be evaluated to determine whether it matches before performing a firmware/software update in an embodiment according to the present invention. If it is determined that the firmware update of the mobile handset 107 is to be conducted, then the download of an associated update package may be initiated, and subsequently, the downloaded update package may be used by the update agent 131 to update the firmware, as part of other OTAPA/OTASP activities.

In an embodiment according to the present invention, the URL for downloading the update package may be provisioned, using for example, OTAPA/OTASP techniques, along with the NAM parameters. In another embodiment according to the present invention, the URL for downloading the update package may be pre-set by the manufacturer.

In an embodiment according to the present invention, the mobile handset 107 may be programmed with a special service option for changing the firmware in the mobile handset 107, for example, a firmware update service option (FUSO), in addition to a service option for modification of NAM parameters, namely the Parameter Administration Service Option (PASO), which may include assignment of a PASO number. The FUSO may also be associated with a FUSO number in an embodiment according to the present invention. The mobile handset 107 may also have one or more parameter change codes (PCC's) stored in memory for NAM parameter changes and an additional firmware update code (FUC) associated with the FUSO, i.e. the firmware update of the mobile handset 107.

In an embodiment according to the present invention, the mobile handset 107 may be programmed with the firmware update service option (FUSO), and a FUSO number may also be associated with the option. During an OTAPA procedure, the base station 109 may send a General Page Message to the mobile handset 107 using the FUSO number.

After verifying the message identity using standard Authentication processes, if the mobile handset is OTAPA capable, the mobile handset may respond with a Page Response Message, indicating support for the FUSO by sending the FUSO number. If the mobile handset 107 does not support the option, the response may indicate that the option is unavailable.

In an embodiment according to the present invention, OTAPA-based parameters may change in the mobile handset 107, such as NAM parameter changes, that may result in setting an "update needed flag" in the mobile handset 107, indicating availability of an update package for the mobile handset 107 in device server 119, and a need to download the update package to update the firmware and/or software (such as applications or services subscribed to by the end-user). After parameter modifications during an OTAPA process, the mobile handset 107 may determine the need to update firmware/software based upon the "update needed flag" settings that may have been set during the OTAPA process and may employ the download agent 133 to retrieve the update package 149 from device server 119 (or an alternative server). The URL may be programmed in the NAM 147 during the OTAPA process.

In an embodiment according to the present invention, when a mobile handset user signs up for a mobile network service, the user may pick several device features, such as a audio/video playback, a musical instrument digital interface (MIDI) player, a MP3 player, a gaming engine, etc.

The services or features subscribed to by the mobile handset user may be recorded by a customer care center 141, and also may be saved in a provisioning server 143. When the mobile handset user initially uses the mobile handset 107 in the electronic device network 105, base station 109 or MSC 111 may recognize that the mobile handset 107 is new to the electronic device network 105 and may initiate provisioning of the mobile handset 107 if the mobile handset has not already been provisioned in the electronic device network 105.

Additionally, the electronic device network 105 may also contact the customer care center 141 to communicate the event, providing the customer care center 141 with an opportunity to download necessary software into the mobile handset 107 so that the mobile handset user may be enabled use the subscribed services. The customer care center 141 may contact provisioning server 143 to determine the subscribed services of the mobile handset user and contact device server 119 (or update store 121) to determine update packages that may be used to install or update firmware/software in the mobile handset 107 associated with the subscribed services.

The customer care center 141 may, for example, communicate information regarding update packages to the mobile handset during initial provisioning of the mobile handset 107, providing the mobile handset 107 (or mobile handset user) an opportunity to download required update packages (for firmware updates and software installation, etc.) during the provisioning process or subsequent to the provisioning process.

In an embodiment according to the present invention, a mobile handset user may be a corporate user subscribing to a wireless service for corporate customers. Initial access by the mobile handset 107 to the electronic device network 105 may result in an OTASP/OTAPA process that may also include downloading corporate software, updating of existing firmware, and downloading corporate data (such as calendar data and address book data) into the mobile handset 107, in addition to changing or setting the NAM parameters, etc.

In an embodiment according to the present invention, the electronic device network 105 may employ a standard service category called "Firmware Update" that may be employed to initiate firmware updates of mobile handsets, or to disseminate information or queries related to firmware updates in the electronic device network 105.

In an embodiment according to the present invention, the electronic device network 105 may employ a proprietary service option/category called "Firmware Update" while also employing a proprietary service option, such as a proprietary FUSO.

When mobile handset 107 is initially used in the electronic device network 105, the electronic device network 105 may determine the ability of the mobile handset 107 to update firmware and/or software, determine the need to update firmware and/or software, and initiate downloading of update packages for subsequent update by the update agent 131.

In an embodiment according to the present invention, when the electronic device network 105 determines that the mobile handset 107 is capable of updating firmware and/or software, the electronic device network 105 may provision the mobile handset 107 with server information, such as for example, the URL of device server 119, security information, etc., in conjunction with NAM programming, or separately. The electronic device network 105 may also set flags and other related information to indicate that downloading of update packages and an update activity may be conducted employing appropriate data channels and protocols. The electronic device network 105 may also cause display of message(s) to the mobile handset user indicating that downloads may be followed by a subsequent update activity. Other types of messages to the mobile handset user are also contemplated. Downloading of one or more update packages to update firmware and/or software in the mobile handset 107 may be conducted by using data channels and employing, for example, TCP/IP and HTTP protocols.

Although a General Page Message has been described herein as a means wherein the mobile handset 107 and the base station 109 (or alternatively, the MSC 111) may interact, other communication mechanisms are also contemplated.

Figure 2:
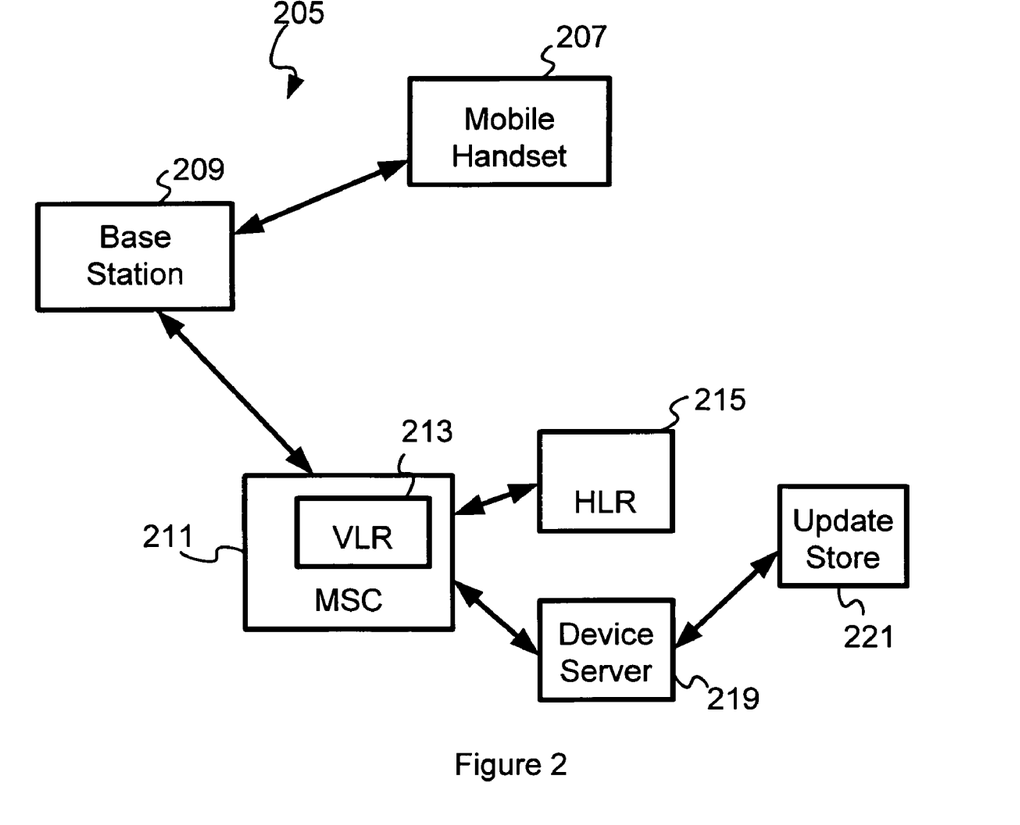
FIG. 2 is a block diagram illustrating an electronic device network employing a general page message according to an embodiment of the present invention.

FIG. 2 is a block diagram illustrating an electronic device network 205 employing a General Page Message according to an embodiment of the present invention.

FIG. 2 discloses an electronic device network 205 employing a General Page Message (GPM) to determine whether an electronic device, for example, mobile handset 207, supports firmware update service option (FUSO) indicating the capability of facilitating firmware updates. The mobile handset 207 may be programmed with the FUSO service option for updating firmware. The FUSO service option may comprise one of a proprietary FUSO and a non-proprietary FUSO, wherein both proprietary and non-proprietary FUSO may have an associated FUSO number programmed in the mobile handset 207.

In an embodiment according to the present invention, when the electronic device network 205 updates firmware (and other software) in mobile handset 207, base station 209 may initiate a mobile terminated call by sending a GPM, along with initial inquiries regarding availability of FUSO, including a FUSO number for mobile handset 207. In an embodiment according to the present invention, the FUSO option may be implemented as an extension to existing specifications, such as, for example, IS-136, IS-95, IS-2000, IS-41, etc.

Upon receiving the GPM, along with initial inquiries regarding availability of the FUSO option, and including a FUSO number for the mobile handset 207, the mobile handset 207 may send back a response to the base station 209 indicating the ability to facilitate firmware updates. If a FUSO number has been provided, then, the mobile handset 207 may compare the FUSO number received with a stored FUSO number (provided by the manufacturer or by a previous provisioning process) to determine whether the FUSO numbers match. If a match occurs, the response to the GPM, back to base station 209, (or alternatively, the MSC 211) may indicate that the mobile handset is associated with the FUSO number. Otherwise, a response indicating a negative match may be sent or no response may be sent at all.

In an embodiment according to the present invention, mobile handset 207 may periodically send information via base station 209 to MSC 211, or a customer care entity, indicating the ability to update firmware and/or software. In response, the MSC 211 or customer care entity, may determine availability of update packages for the mobile handset 207, based on mobile handset characteristics (such as make, model, firmware version, hardware version, etc.) and may inquire to device server 219 and communicate information (e.g., update packages) to the mobile handset 207. The MCS 211 in the electronic device network 205 may also comprise VLR 213. The electronic device network 205 may also comprise HLR 215 and update store 221 as set forth in the discussion related to the HLR 115 and the update store 121 as illustrated in FIG. 1 above.

In an embodiment according to the present invention, the mobile handset 207 may regularly communicate the ability to update firmware/software to the electronic device network 205 with which the mobile handset 207 interacts.

Figure 3:
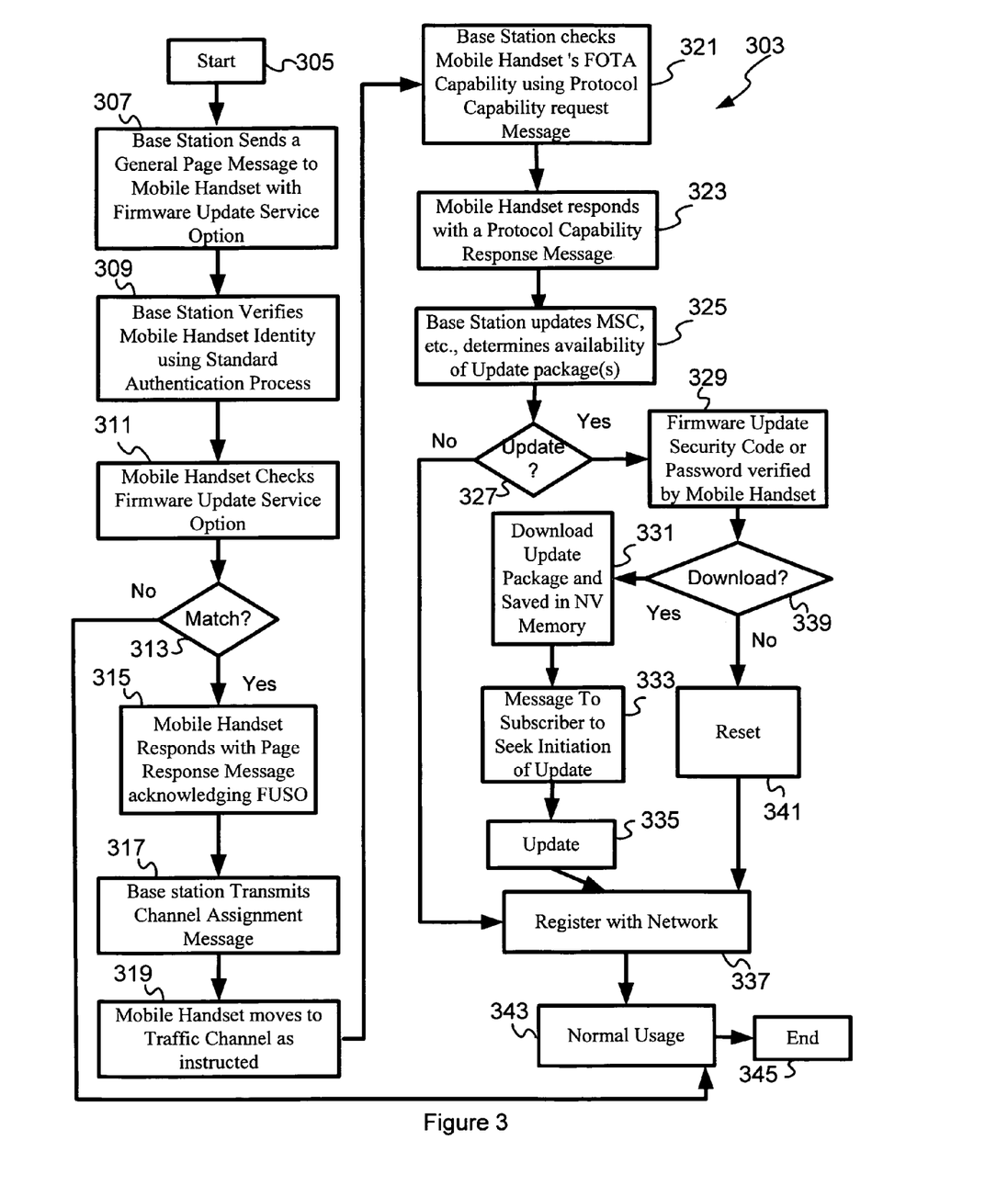
FIG. 3 is a flow chart illustrating an exemplary operation of an electronic device network according to an embodiment of the present invention.

FIG. 3 is a flow chart illustrating an exemplary operation of an electronic device network according to an embodiment of the present invention.

FIG. 3 is a flow chart 303 illustrating operation of the electronic device network 205 facilitating firmware update related interactions between mobile handset 207 and other entities in the electronic device network 205. At block 305, processing starts when the electronic device network 205 sends a GPM to one or more mobile handsets in the electronic device network 205.

At block 307, base station 209 (or a plurality of base stations in a local area) may send a GPM to the mobile handsets having the FUSO service option, in order to conduct firmware-update related activity and determine whether, for example, mobile handset 207 is capable of conducting firmware updates and/or software updates. At block 309, the base station 209 or alternatively, the MSC 211, may verify mobile handset identity using standard authentication processes, such as, standard authentication processes employed by OTAPA operations or other related activities.

At block 311, the mobile handset 207 may check firmware update service options. The mobile station 207 may verify support of the FUSO option, thus determining the capability of conducting firmware updates, wherein a response may be sent back to base station 109, for eventual processing by MSC 211 or other entities in the electronic device network 205.

At block 313, mobile handset 207 may determine whether there is a match in the FUSO service options. If, at block 313, it is determined that FUSO is supported and a match has occurred, then, at block 315, mobile station 207 may respond with a Page Response Message acknowledging FUSO capability. At block 317, base station 209 may transmit a channel assignment message to the mobile handset 207. At block 319, mobile handset 207 may move to the Traffic Channel, as instructed.

At block 321, base station 209 may check the mobile handset's firmware update over-the-air capability using, for example, a protocol capability request message. In response, at block 323, mobile handset 207 may respond with a protocol capability response message. At block 325, base station 209 may update the customer care database or provisioning server with capability information received from the mobile handset 207. Base station 209 may also determine availability of update packages appropriate for the mobile handset 207.

At block 327, base station 209 may determine whether the mobile handset 207 is to be updated using update packages. If, based upon the characteristics of the mobile handset 207, and other parameters, base station 209 (or MSC 211) may determine that firmware and/or software in the mobile handset 207 is to be updated. Then, at block 337, mobile handset 207 may complete a registration with the electronic device network 205 before normal usage of the mobile handset 207 resumes at block 343 and processing ends at block 345.

If, at block 327, it is determined that the mobile handset 207 is capable of updating firmware and firmware update packages are available, then at block 329, a firmware update security code (FUSC), similar to a parameter change code (PCC) may be used to change mobile handset parameter values, and may be verified by the mobile handset 207. In an embodiment according to the present invention, a password may be employed in place of the FUSC. After verifying the FUSC or the password, at block 339, mobile handset 207 may attempt to determine whether a download of update packages may be initiated.

If, at block 339, it is determined that a download may be initiated, then, at block 331, one or more update packages may be downloaded from device server 219 in the electronic device network 205, and saved in non-volatile memory 101 (see FIG. 1) of the mobile handset 207. After download, at block 333, a message may be displayed to the subscriber indicated an opportunity to update firmware and/or software, and a prompt may be provided to solicit subscriber approval. The update agent 131 may be invoked at block 335 to conduct a firmware and/or software update. The mobile handset 207 may register with the electronic device network 205 at block 337, before resuming normal usage at block 343.

If, at block 329, it is determined that a download of update packages need not be initiated, then at block 341, the information related to appropriate update packages identified for the mobile handset 207, such as URLs and security information, may be saved for subsequent retrieval attempts employing data channels. Additionally, one or more flags may be set (for example, in non-volatile memory) indicating availability of update packages and/or the need to update mobile handset 207. The mobile handset 207 may be reset in preparation for registration with the electronic device network 205 at block 337 before normal usage commences at 343 prior to final termination of processing at block 345.

In an embodiment according to the present invention, if at 339, it is determined that a download of update packages need not be initiated, then at block 341, the firmware update related processing and communication between mobile handset 207 and base station 209 may be terminated and mobile handset 207 may register with the electronic device network 205 at block 337, before commencing normal usage at block 343.

If, at block 313, a match for the FUSO service options/number is not found, indicating a lack of support for firmware updates in the mobile handset 207, then at block 343, normal usage of the mobile handset 207 may resume and processing ends at block 345.

In an embodiment according to the present invention, at block 307, the base station 209 (or a plurality of base stations in a local area) may send a GPM to mobile station 207 with the FUSO service option, including a FUSO number, in order to conduct a firmware-update related activity, and to determine if one (or more) mobile handsets, such as mobile handset 207, are capable of conducting firmware updates (and/or software updates) and possess matching FUSO numbers provisioned previously, during initial provisioning or set by the manufacturer at factory.

Figure 4:
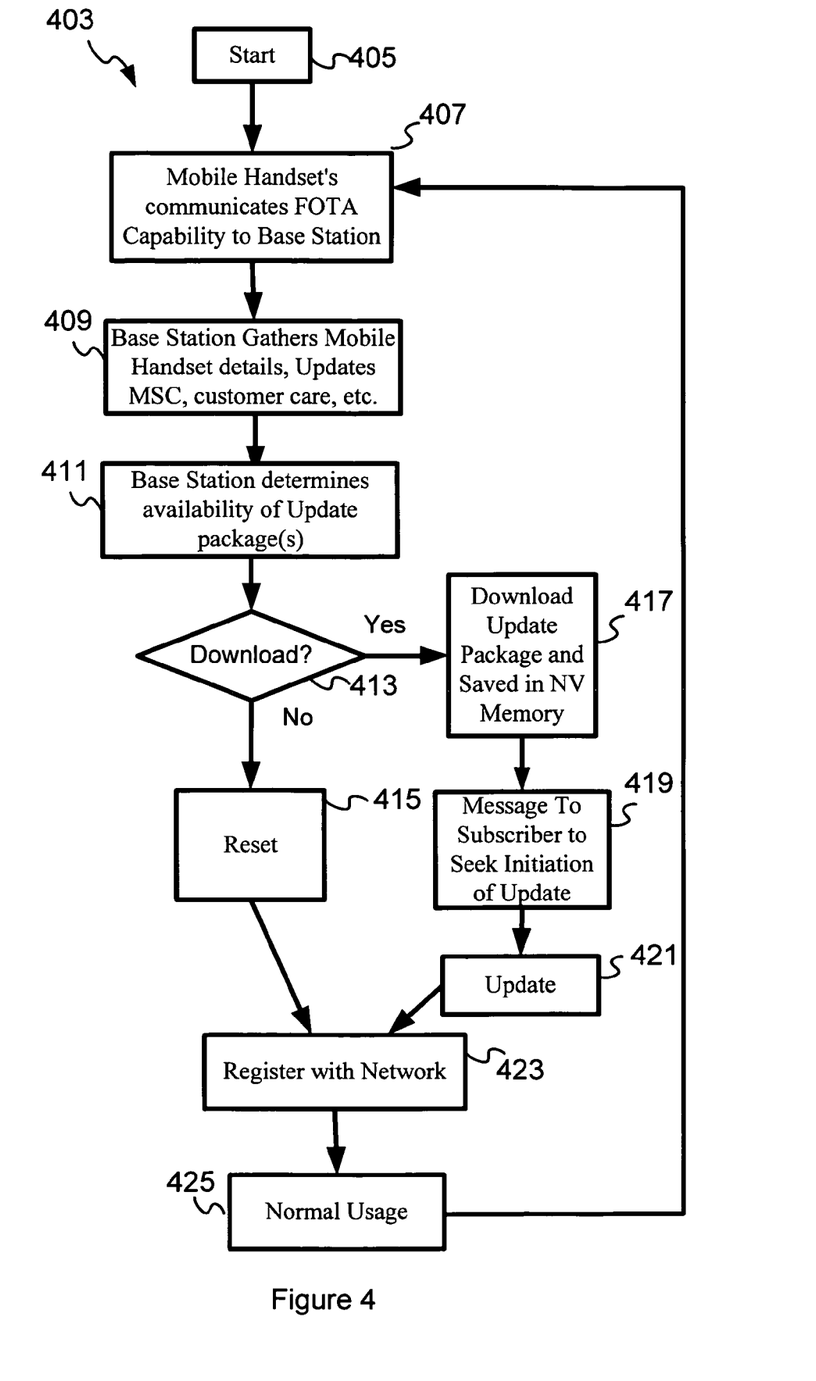
FIG. 4 is a flow chart illustrating an exemplary operation of an electronic device network according to an embodiment of the present invention.

FIG. 4 is a flow chart 403 illustrating an exemplary operation of an electronic device network according to an embodiment of the present invention.

FIG. 4 illustrates operation of the electronic device network 205, wherein mobile handset 207 may be capable of communicating firmware update capability to electronic device network 205, periodically or as necessary, in order to solicit information regarding available update packages from the electronic device network 205, base station 209, MSC 211, device server 219, etc. At block 405, mobile handset 207 starts normal operations. At block 407, mobile handset 207 may communicate firmware-over-the-air (FOTA) capabilities to base station 209. At block 409, base station 209 may gather mobile handset characteristics, such as, manufacturer, model, versions, etc. Base station 209 may communicate such information to the MSC 211, customer care center 141, device server 219, update store 121, etc.

At block 411, a server in the electronic device network may determine availability of update packages at device server 219 and communicate the information to the mobile handset via base station 209. The network server may then endeavor, at block 413, to determine whether mobile handset 207 is ready to download update packages that are currently available again via communication through base station 209. If, at block 413, it is determined that the mobile handset is able to initiate download of update packages, then, at block 417, mobile handset 207 may initiate download of the update package(s) and save the download update package(s) in storage, such as, non-volatile memory. At block 419, mobile handset 207 may display a message to the subscriber seeking approval for initiation of the update process employing update agent 131 in mobile handset 207, for example. After soliciting subscriber approval via a prompt and receiving subscriber approval, mobile handset 207 may update firmware and/or software at block 421. After update, the mobile handset 207 may register with electronic device network 205 at block 423 before resuming normal operations at block 425. The method may loop back to block 407, and may communicate FOTA capability to the network server via base station 209.

If, at block 413, it is determined that mobile handset 207 may not currently initiate download of update packages, then, at block 415, firmware update related activities may be terminated, and communications related to firmware updates may be reset before registering with the electronic device network 205 at block 423. Normal operations may resume at block 425. The method may loop back to block 407, and may communicate FOTA capability to the network server via base station 209.

In an embodiment according to the present invention, electronic device network 205 may be capable of determining whether mobile handset 207 is capable of facilitating firmware updates based upon firmware update service options (FUSO) and associated FUSO numbers. When a mobile handset is initially used in the electronic device network 205, an OTAPA process may be employed not only to program NAM parameters but also for initiating firmware updates or for setting flags and parameters facilitating subsequent firmware updates. Mobile handset 207, may periodically or as necessary, communicate the ability to update firmware and/or software to the electronic device network 205.

In an embodiment according to the present invention, electronic device networks 105 and 205, respectively, may support both mobile handset features announcing firmware update capability to associated networks and associated networks ability to determine whether mobile handset 207 is capable of firmware updates.

In an embodiment according to the present invention, mobile handset 207 may be capable of ascertaining whether the network operator is capable of "pushing" update packages without any interaction from an end-user or subscriber. The mobile handset 207 may inform the subscriber to block such "push". The mobile handset 207 may also inform the subscriber to enable such "push" where no subscriber intervention is necessary.

Although a system and method according to the present invention has been described in connection with a preferred embodiment, the invention is not intended to be limited to the specific form set forth herein, but on the contrary, is intended to cover such alternative modifications and equivalents, as can be reasonably included within the spirit and scope of the invention, as defined by this disclosure and the appended diagrams. It is intended that the scope of the invention be limited not with this detailed description, but rather by the claims appended hereto.

What is claimed is:

1. A mobile electronic device network employing provisioning techniques for updating electronic devices, the network comprising:

a customer care center;

a device server capable of dispensing at least one update;

an electronic device having at least one of firmware and software, the electronic device being communicatively coupled to the device server and the customer care center, the electronic device notifying the customer care center to download at least one of firmware and software for subscribed services into the electronic device to enable use of the subscribed services;

an update service in the electronic device, the presence of the update service in the electronic device being determinable by the network, wherein, when enabled, the update service indicates to the network capability of the electronic device to update at least one of firmware and software for the subscribed services, the electronic device employing the at least one update to update the at least one of firmware and software for the subscribed services; and wherein one or more parameters specific to updating the at least one of firmware and software for the subscribed services in the electronic device are provisioned, during provisioning of a number assignment module (NAM) in the electronic device, by the network.

2. The network according to claim 1, wherein the device server is adapted to store and dispense a plurality of updates, wherein the at least one update dispensed to the electronic device is selected from the plurality of updates based upon characteristics of the electronic device communicated to the device server.

3. The network according to claim 2, further comprising: scheduling software for at least one update of one of firmware and software for the subscribed services in the electronic device during administration of the NAM parameters by the network.

4. The network according to claim 3, wherein the network is capable of determining whether the electronic device supports an over-the-air provisioning function, and wherein the electronic device is capable of executing the over-the-air provisioning function, and wherein the over-the-air provisioning function comprises one of a firmware update function and a software update function in the electronic device.

5. The network according to claim 4, wherein one of the firmware update function and the software update function in the electronic device is invoked based upon one of a firmware update service option and a software update service option provided in the electronic device.

6. The network according to claim 5, further comprising:
an update agent in the electronic device; and
a network server determining a service option and for permitting the electronic device to initiate over-the-air access to one of the firmware update service option and the software update service option in the electronic device, wherein the network is adapted to employ the means for determining a service option to determine one of an enabled firmware update service option and an enabled software update service option in the electronic device and the network is adapted to invoke the update agent while initializing a number assignment module in the electronic device.

7. The network according to claim 6, wherein one of the firmware update service option and the software update service option in the electronic device is adapted to be set by the network without user intervention, and wherein the at least one update selected from the plurality of updates is disseminated to the electronic device, and wherein the update agent is invoked in the electronic device for updating the at least one of firmware and software for the subscribed services employing the at least one updates.

8. The network according to claim 7, further comprising:
over-the-air delivery of the at least one update to the electronic device from a delivery server after determining that one of the firmware update service option and the software update service option in the electronic device is set.

9. The network according to claim 4, further comprising:
one of a firmware update service function and a software update service function in the electronic device; and
a network server for facilitating network-initiated over-the-air access to one of the firmware update service option and the software update service option in the electronic device, wherein the network initializes the number assignment module in the electronic device and, after determining that one of the firmware update service option and the software update service option in the electronic device is enabled, initiating download of at least one update and updating the at least one of the firmware and software for the subscribed services of the electronic device.

10. A mobile electronic device network adapted to update electronic devices and perform over-the-air number assignment module parameter provisioning, the network comprising:
an electronic device configured to notify a customer care center to download at least one of firmware and software for subscribed services into the electronic device to enable use of the subscribed services, the electronic device also comprising number assignment module parameters specific to updating one or both of the firmware and software for subscribed services, the electronic device being communicatively coupled to at least one server; and
wherein presence of support for at least one of a firmware update service option and a software update service option in the electronic device is determinable by the network, wherein when enabled, the presence of support for the at least one of a firmware update service option and a software update service option indicates to the network that the electronic device is capable of updating one of firmware and software, wherein the electronic device is adapted to communicate the presence of support for the one of the firmware update service option and software update service option to the network, and wherein the electronic device is also adapted to communicate device specifications to the network when the network attempts to provision the number assignment module parameters.

11. The network according to claim 10, wherein the at least one server dispenses at least one of a plurality of updates to the electronic device based upon the presence of support for the one of the firmware update service option and the software update service option and device specifications communicated to the at least one server by the electronic device.

12. The network according to claim 10, wherein the network is adapted to manage updating at least one of firmware and software based upon the presence of support for the one of a firmware update service option and a software update service option in the electronic device determinable by an over-the-air provisioning function in the network.

13. The network according to claim 12, wherein the network is adapted to determine a state of the one of the firmware update service option and the software update service option in the electronic device and provision a universal resource locator in the electronic device for at least one server in the network, wherein the at least server is employed to download updates to the electronic device.

14. A method of updating software in a wireless communication device in a wireless network, the method comprising:
recognizing when the wireless communication device is new to the wireless network and initiating provisioning of the wireless communication device, with subscribed services a user pre-selected when signing up for a network service, if the wireless communication device has not already been provisioned in the wireless network;
determining a value of one of a firmware update service option number and a software update service option number in the wireless communication device by the wireless network during an over-the-air parameter administration operation for programming number assignment module parameters, wherein the one of a firmware update service option number and a software update service option number is a number assignment module parameter specific to updating one or both of firmware and software for the subscribed services; and downloading one of a firmware update and a software update for the subscribed services from a server in the wireless network, if one of the firmware update service option number and the software update service option number is determined to have a predetermined value.

15. The method according to claim 14, wherein the over-the-air parameter administration operation comprises:

paging one of a firmware update service option number and a software update service option number in the wireless communication device;

verifying an identity of the wireless communication device using at least one authentication process; and responding to the paging, if the wireless communication device is capable of supporting the over-the-air parameter administration operation.

16. The method according to claim 15, wherein responding to the paging further comprises:

indicating support for one of a firmware update service option and the software update service option by sending one of the firmware update service option number and the software update service option number, if the wireless communication device supports one of the firmware update service option and the software update service option; and indicating lack of support for one of the firmware update service option and the software update service option, if the wireless communication device does not support one of the firmware update service option and the software update service option.

17. The method according to claim 14, wherein downloading comprises:

setting a flag in the wireless communication device indicating availability of an update package for updating the wireless communication device during an over-the-air parameter administration operation changing number assignment module parameters;

sending a universal resource locator identifying at least one server to the wireless communication device during an over-the-air parameter administration operation changing number assignment module parameters; and retrieving update information from the at least one server based upon the flag.

18. The method according to claim 14, wherein determining comprises:

receiving a general page message indicating one of a firmware update service option and a software update service option by the wireless communication device;

verifying support of one of the firmware update service option and the software up-date service option by the wireless communication device; and sending a response to a base station indicating support of one of firmware and software updates when the wireless communication device verifies support of one of the firmware update service option and the software update service option.

19. The method according to claim 18 wherein verifying further comprises:

paging the wireless communication device for one of a firmware update service option number and a software update service option number;

comparing one of the firmware update service option number and the software update service option number received on one of a stored firmware update service option number and a stored software update service option number in the wireless communication device, to determine a match by the wireless communication device;

responding to the paging, if a match occurs, wherein responding to the paging comprises indicating that the wireless communication device is associated with one of the firmware update service option number and the software update service option number; and responding to the paging indicating a negative match if a match does not occur.

20. A mobile electronic device having a non-transitory computer-readable storage including a non-volatile memory and a processor, the computer-readable storage having stored thereon a computer program having a plurality of code sections enabling over-the-air updating of at least one of firmware and software in an electronic device via a wireless network, the code sections executable by a processor for causing the processor to perform the operations comprising:

sending a message over the wireless network to a device server for recognizing by the device server when the electronic device is new to the wireless network so that the device server initiates provisioning of the electronic device with subscribed services a user pre-selected if the electronic device has not already been provisioned in the network;

after the electronic device has been initially provisioned in the new wireless network, then:

receiving at least one message from a server over the wireless network as part of an over the air parameter administration process for programming number assignment module parameters, the message comprising a service option parameter;

determining whether a value of the service option parameter corresponds to one of a firmware update service option and a software update service option, wherein the one of a firmware update service option number and a software update service option number is a number assignment module parameter specific to updating one or both of firmware and software; and engaging in over the air updating of the at least one of firmware and software of the electronic device via the wireless network, if it is determined that the value of the service option parameter corresponds to the one of a firmware update service option and a software update service option.

21. The mobile electronic device according to claim 20, wherein the electronic device is a battery-operated handheld electronic device.

22. The mobile electronic device according to claim 21, wherein the electronic device is a cellular telephone.

23. The mobile electronic device according to claim 20, wherein the received message is a cellular network message for paging a subscriber telephone.

24. The mobile electronic device according to claim 20, wherein the received service option parameter is compatible with the Electronics Industries Alliance (EIA)/Telecommunications Industry Association (TIA) IS-683 standard.

25. The mobile electronic device according to claim 20, the operations further comprising:

sending a message over the wireless network indicating the presence of support for the one of a firmware update service option and a software update service option, if it is determined that the value of the service option parameter corresponds to the one of a firmware update service option and a software update service option.

26. The mobile electronic device according to claim 20, the operations further comprising:

verifying the identity of the server to the electronic device using an authentication procedure, prior to engaging in over the air updating.

27. The network according to claim 1, further comprising a base station, the base station recognizing when the electronic device is new to the network and initiating provisioning of the electronic device with the subscribed services a user selected if the electronic device has not already been provisioned in the network.

28. The network according to claim 10, further comprising a base station, the base station recognizing when the electronic device is new to the network and initiating provisioning of the electronic device with the subscribed services a user selected if the electronic device has not already been provisioned in the network.

29. The method according to claim 14, further comprising notifying a customer care center to download at least one of firmware and software for the subscribed services into the wireless communication device to enable use of the subscribed services.

30. The mobile electronic device according to claim 20, the operations further comprising:

notifying a customer care center to download at least one of firmware and software for the subscribed services into the electronic device to enable use of the subscribed services.

* * * * *

UNITED STATES PATENT AND TRADEMARK OFFICE
CERTIFICATE OF CORRECTION

| | | |
|---|---|---|
| PATENT NO. | : 7,881,745 B1 | Page 1 of 1 |
| APPLICATION NO. | : 10/797176 | |
| DATED | : February 1, 2011 | |
| INVENTOR(S) | : Bindu Rama Rao et al. | |

It is certified that error appears in the above-identified patent and that said Letters Patent is hereby corrected as shown below:

In column 16, line 49, in Claim 13, delete "at least server" and insert -- at least one server --, therefor.

In column 17, line 59, in Claim 19, delete "claim 18" and insert -- claim 18, --, therefor.

Signed and Sealed this
Seventeenth Day of May, 2011

David J. Kappos
*Director of the United States Patent and Trademark Office*